(12) United States Patent
Vega-Zayas et al.

(10) Patent No.: US 9,521,454 B2
(45) Date of Patent: *Dec. 13, 2016

(54) ASSOCIATING PLAYBACK DEVICES WITH PLAYBACK QUEUES

(71) Applicant: Sonos, Inc., Santa Barbara, CA (US)

(72) Inventors: Luis R. Vega-Zayas, Cambridge, MA (US); Kristen Johansen, Santa Barbara, CA (US); Paul Bates, Santa Barbara, CA (US); Abhishek Kumar, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,165

(22) Filed: Sep. 16, 2015

(65) Prior Publication Data

US 2016/0007079 A1 Jan. 7, 2016

Related U.S. Application Data

(63) Continuation of application No. 13/944,702, filed on Jul. 17, 2013, now Pat. No. 9,232,277.

(51) Int. Cl.
*G06F 17/00* (2006.01)
*H04N 21/436* (2011.01)
(Continued)

(52) U.S. Cl.
CPC .. *H04N 21/43615* (2013.01); *H04N 21/26258* (2013.01); *H04N 21/439* (2013.01);
(Continued)

(58) Field of Classification Search
CPC .................. H04N 21/4825; H04N 21/43615; H04N 21/26258; G06F 17/30053; G06F 17/30017; G06F 3/0482; H04R 2227/005
See application file for complete search history.

(56) References Cited

U.S. PATENT DOCUMENTS 5,406,634 A 4/1995 Anderson et al.
5,856,827 A 1/1999 Sudo
(Continued)

FOREIGN PATENT DOCUMENTS

KR 1020050013230 2/2005
WO 0153994 A2 7/2001

OTHER PUBLICATIONS

"AudioTron Quick Start Guide, Version 1.0", Voyetra Turtle Beach, Inc., Mar. 2001, 24 pages.
(Continued)

*Primary Examiner* — Andrew C Flanders
(74) *Attorney, Agent, or Firm* — McDonnell Boehnen Hulbert & Berghoff LLP

(57) ABSTRACT

In an example implementation, a first playback device associates with a first playback queue that identifies items for playback by the first playback device. The first playback device receives an instruction to enter a playback group with a second playback device which is associated with a second playback queue that identifies one or more items for playback by the second playback device. The first playback device enters the playback group with the second playback device. The first playback device is configured to play items from the second playback queue in synchrony with the second playback device while in the playback group. The first playback device receives an instruction to leave the playback group and leaves the playback group. Leaving the playback group involves automatically associating the first playback device with a third playback queue that identifies items for playback by the first playback device.

20 Claims, 11 Drawing Sheets

(51) Int. Cl.
*H04N 21/482* (2011.01)
*H04N 21/4363* (2011.01)
*H04N 21/439* (2011.01)
*H04N 21/262* (2011.01)
*H04N 21/61* (2011.01)

(52) U.S. Cl.
CPC ..... *H04N 21/43637* (2013.01); *H04N 21/482* (2013.01); *H04N 21/4825* (2013.01); *H04N 21/6175* (2013.01); *H04R 2227/005* (2013.01)

(56) References Cited

U.S. PATENT DOCUMENTS

| | | |
|---|---|---|
| 5,923,902 A | 7/1999 | Inagaki |
| 6,002,862 A | 12/1999 | Takaike |
| 6,181,316 B1 | 1/2001 | Little et al. |
| 6,255,961 B1 | 7/2001 | Van Ryzin et al. |
| 6,256,554 B1 | 7/2001 | DiLorenzo |
| 6,404,811 B1 | 6/2002 | Cvetko et al. |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,280,133 B2 | 10/2007 | Lord |
| 7,312,785 B2 | 12/2007 | Tsuk et al. |
| 7,358,960 B2 | 4/2008 | Mak |
| 7,483,538 B2 | 1/2009 | McCarty et al. |
| 7,571,014 B1 | 8/2009 | Lambourne et al. |
| 7,643,894 B2 | 1/2010 | Braithwaite et al. |
| 7,657,910 B1 | 2/2010 | McAulay et al. |
| 7,742,740 B2 | 6/2010 | Goldberg et al. |
| 7,797,446 B2 | 9/2010 | Heller et al. |
| 7,805,682 B1 | 9/2010 | Lambourne |
| 7,853,341 B2 | 12/2010 | McCarty et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,131,390 B2 | 3/2012 | Braithwaite et al. |
| 8,148,622 B2 | 4/2012 | Rothkopf et al. |
| 8,234,395 B2 | 7/2012 | Millington et al. |
| 8,624,098 B2 | 1/2014 | Rothkopf et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0163361 A1 | 11/2002 | Parkin |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0157951 A1 | 8/2003 | Hasty |
| 2003/0210796 A1 | 11/2003 | McCarty et al. |
| 2003/0221541 A1 | 12/2003 | Platt |
| 2003/0235407 A1 | 12/2003 | Lord |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0215611 A1 | 10/2004 | Jawa et al. |
| 2004/0261040 A1 | 12/2004 | Radcliffe et al. |
| 2005/0108320 A1 | 5/2005 | Lord et al. |
| 2005/0166157 A1 | 7/2005 | Ollis et al. |
| 2006/0107237 A1 | 5/2006 | Kim |
| 2006/0168340 A1 | 7/2006 | Heller et al. |
| 2006/0253782 A1 | 11/2006 | Stark et al. |
| 2007/0038999 A1 | 2/2007 | Millington et al. |
| 2007/0142944 A1 | 6/2007 | Goldberg et al. |
| 2007/0288470 A1 | 12/2007 | Kauniskangas et al. |
| 2008/0005690 A1 | 1/2008 | Van |
| 2008/0016465 A1 | 1/2008 | Foxenland |
| 2009/0228919 A1 | 9/2009 | Zott et al. |
| 2009/0249222 A1 | 10/2009 | Schmidt et al. |
| 2011/0004330 A1 | 1/2011 | Rothkopf et al. |
| 2011/0154198 A1 | 6/2011 | Bachman et al. |
| 2012/0089910 A1 | 4/2012 | Cassidy |
| 2012/0117586 A1 | 5/2012 | McCoy et al. |
| 2012/0150614 A1 | 6/2012 | Dion et al. |
| 2012/0185771 A1 | 7/2012 | Rothkopf et al. |
| 2012/0210226 A1 | 8/2012 | McCoy et al. |
| 2013/0174204 A1 | 7/2013 | Coburn et al. |
| 2013/0219273 A1 | 8/2013 | Coburn |
| 2013/0254207 A1 | 9/2013 | Coburn |
| 2013/0343567 A1 | 12/2013 | Triplett et al. |
| 2014/0005813 A1 | 1/2014 | Reimann |
| 2014/0181107 A1 | 6/2014 | Coburn et al. |
| 2014/0181199 A1 | 6/2014 | Kumar et al. |
| 2014/0181654 A1 | 6/2014 | Kumar et al. |
| 2014/0181655 A1 | 6/2014 | Kumar et al. |
| 2014/0195909 A1 | 7/2014 | Rothkopf et al. |
| 2014/0310597 A1 | 10/2014 | Triplett et al. |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

"Bluetooth. "Specification of the Bluetooth System: The ad hoc SCATTERNET for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Dell, Inc. "Dell Digital Audio Receiver: Reference Guide" Jun. 2000, 70 pages".

"Dell, Inc. "Start Here" Jun. 2000, 2 pages".

"International Searching Authority, "International Search Report and Written Opinion," issued in connection with PCT application PCT/US2014/046833, on Nov. 3, 2014, 11 pages".

Jo J., et al., "Synchronized One-to-many Media Streaming with Adaptive Playout Control," Proceedings of SPIE, 2002, vol. 4861, pp. 71-82.

"Jones, Stephen. "Dell Digital Audio Receiver: Digital upgrade for your analog stereo" Analog Stereo. Jun. 24, 2000 retrieved Jun. 18, 2014, 2 pages".

"Louderback, Jim. "Affordable Audio Receiver Furnishes Homes With MP3" TechTV Vault. Jun. 28, 2000, retrieved Jul. 10, 2014, 2 pages".

Motorola., "Simplefi, Wireless Digital Audio Receiver, Installation and User Guide", Dec. 31, 2001.

"Non-Final Office Action mailed on Apr. 28, 2015, issued in connection with U.S. Appl. No. 13/944,702, filed Jul. 17, 2013, 11 pages".

"Notice of Allowance mailed on Sep. 14, 2015, issued in connection with U.S. Appl. No. 13/944,702, filed Jul. 17, 2013, 7 pages".

"Palm, Inc. "Handbook for the Palm VII Handheld" May 2000, 311 pages".

"Presentations at WinHEC 2000 May 2000, 138 pages".

PRISMIQ; Inc., "PRISMIQ Media Player User Guide", 2003, 44 pages.

"UPnP; "Universal Plug and Play Device Architecture"; Jun. 8, 2000; version 1.0; Microsoft Corporation; pp. 1-54".

(56) References Cited

OTHER PUBLICATIONS

European Patent Office, Supplementary European Search Report mailed on Apr. 15, 2016, issued in connection with European Patent Application No. 14826784.2, 8 pages.
Notice of Allowance mailed on Nov. 6, 2015, issued in connection with U.S. Appl. No. 13/944,702, filed Jul. 17, 2013, 7 pages.

ASSOCIATING PLAYBACK DEVICES WITH PLAYBACK QUEUES

CROSS REFERENCE TO RELATED APPLICATIONS

This application is a continuation of U.S. non-provisional patent application Ser. No. 13/944,702, filed on Jul. 17, 2013, entitled "Associating Playback Devices With Playback Queues," which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
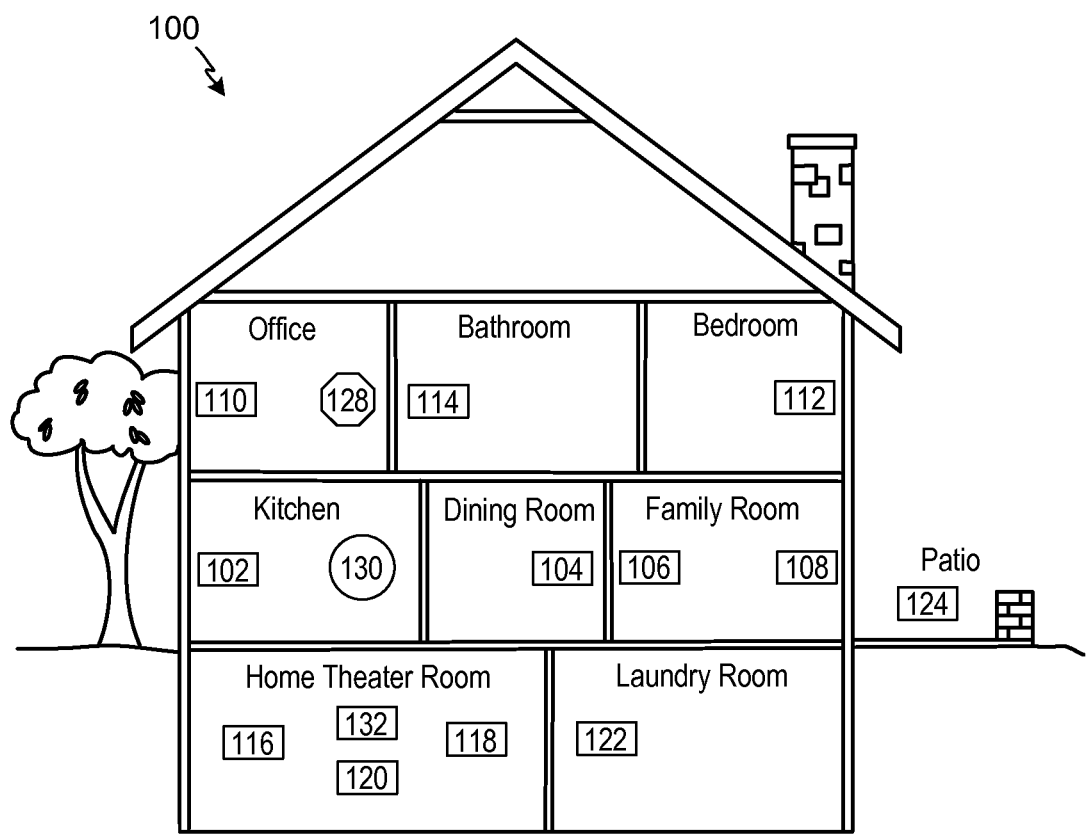
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

A media playback device may be configured to play audio content from a playback queue associated with or assigned to the playback device. In some examples, the playback device may be grouped with another playback device to play audio in synchrony, and in some examples, a playback queue is associated with or assigned to the group. At some point, the playback device may be removed from the group. Upon removal of the playback device from the group, a user may wish to play audio from the playback device, either at the time of removal from the group or at a later time, without manually reassigning the playback device to a playback queue.

Creation of playback queues is an important element in playing audio from a playback device or a group of playback devices. In some examples, a user may create a playback queue and assign a playback device (or group of playback devices) to the playback queue at the time of creation of the playback queue. In other examples, a user may create a playback queue, however, the user may choose not to assign a playback device (or group of playback devices) to the playback queue until a later time such that the playback queue persists without being assigned to a playback device (or group of playback devices).

Example methods, apparatus, systems, and articles of manufacture disclosed herein enable a playback device to automatically associate with a playback queue such that the playback device is continuously enabled to play content from a playback queue. For example, a playback device may associate with a first playback queue. At some future point in time, the playback device may link to a group of playback devices such that the playback device plays content from a second playback queue that is associated with the group. In some examples, the playback device may maintain an association with the first playback queue while it is in the group. For as long as the playback device is in the group, the playback device may be selectively removed from the group. Upon removal from the group, the playback device is automatically associated with a playback queue. In some examples, the playback device may restore the first playback queue, maintain the association with the second playback queue, and/or associate with a new playback queue. Further examples disclosed herein provide for the creation and persistence of playback queues without an association to a playback device or group of playback devices. Example methods and apparatus disclosed herein may advantageously provide for improved usability of a playback device upon dissociation of the playback device from a networked group as well as improved configurability of playback queues.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
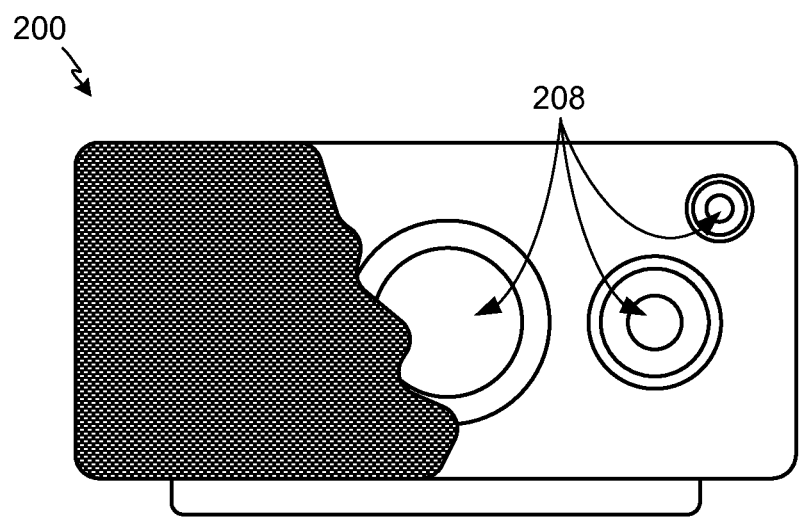
FIG. 2A shows an illustration of an example zone player having a built-in amplifier and transducers.
Figure 2B:
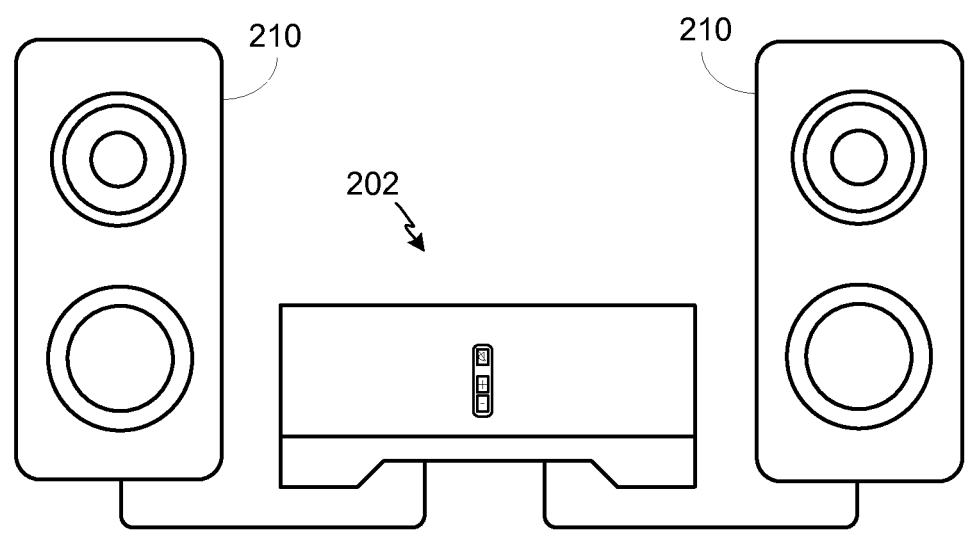
FIG. 2B shows an illustration of an example zone player having a built-in amplifier and connected to external speakers.
Figure 2C:
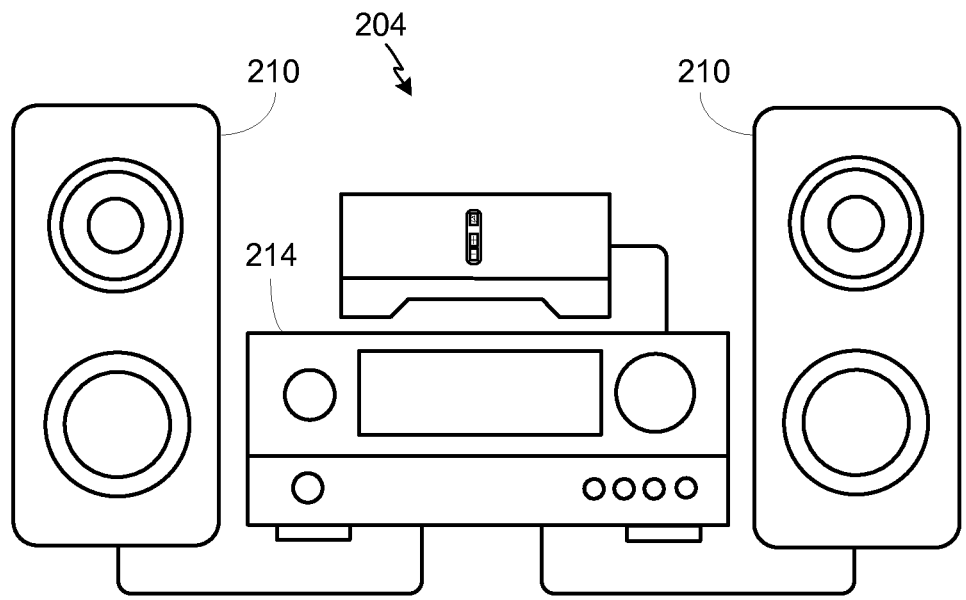
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings.

For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
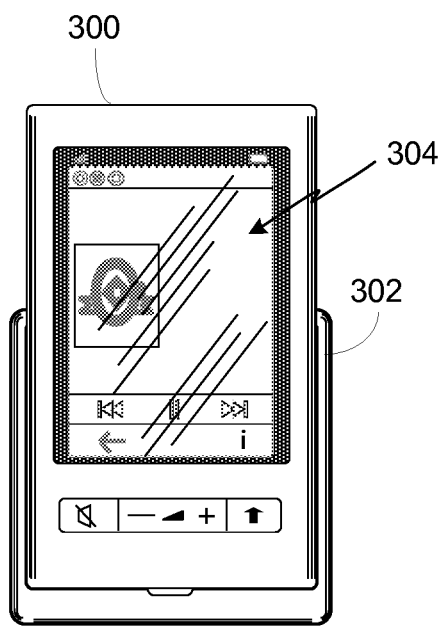
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" is a zone that contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
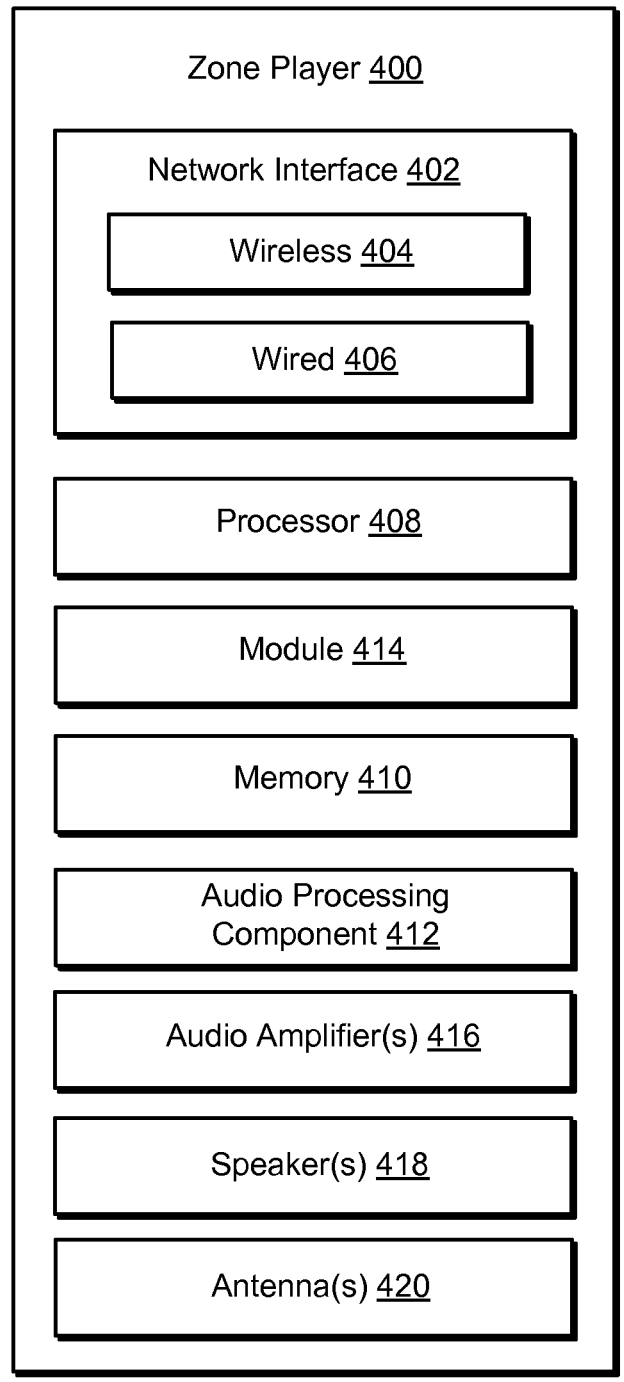
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
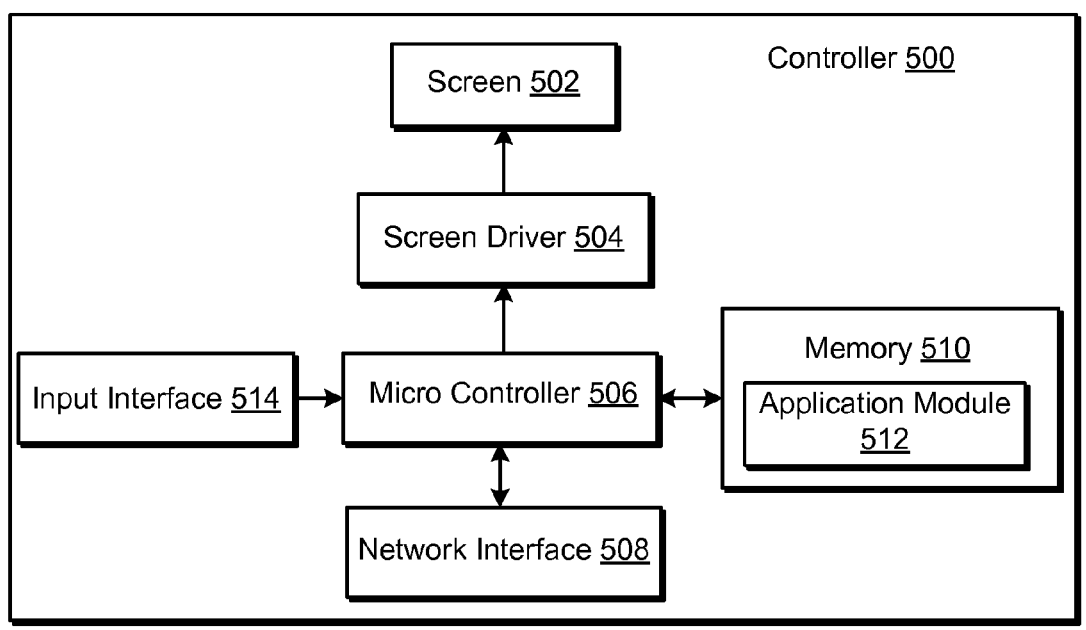
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to or otherwise associated with a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a "family room+ dining room" playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a playback queue. In some examples, after ungrouping, the family room and the dining room are assigned to different playback queues having different audio content. In other examples, the family room and the dining room are assigned to the same playback queue or separate playback queues having the same or substantially the same audio content. In further examples, the family room and/or the dining room may be assigned to the "family room+ dining room" playback queue. One or more of the zone players in the zone or zone group may store in memory the associated playback queue.

As such, when zones or zone groups are "grouped" or "ungrouped" dynamically by the user via a controller, the system will, in some embodiments, establish or remove/ rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
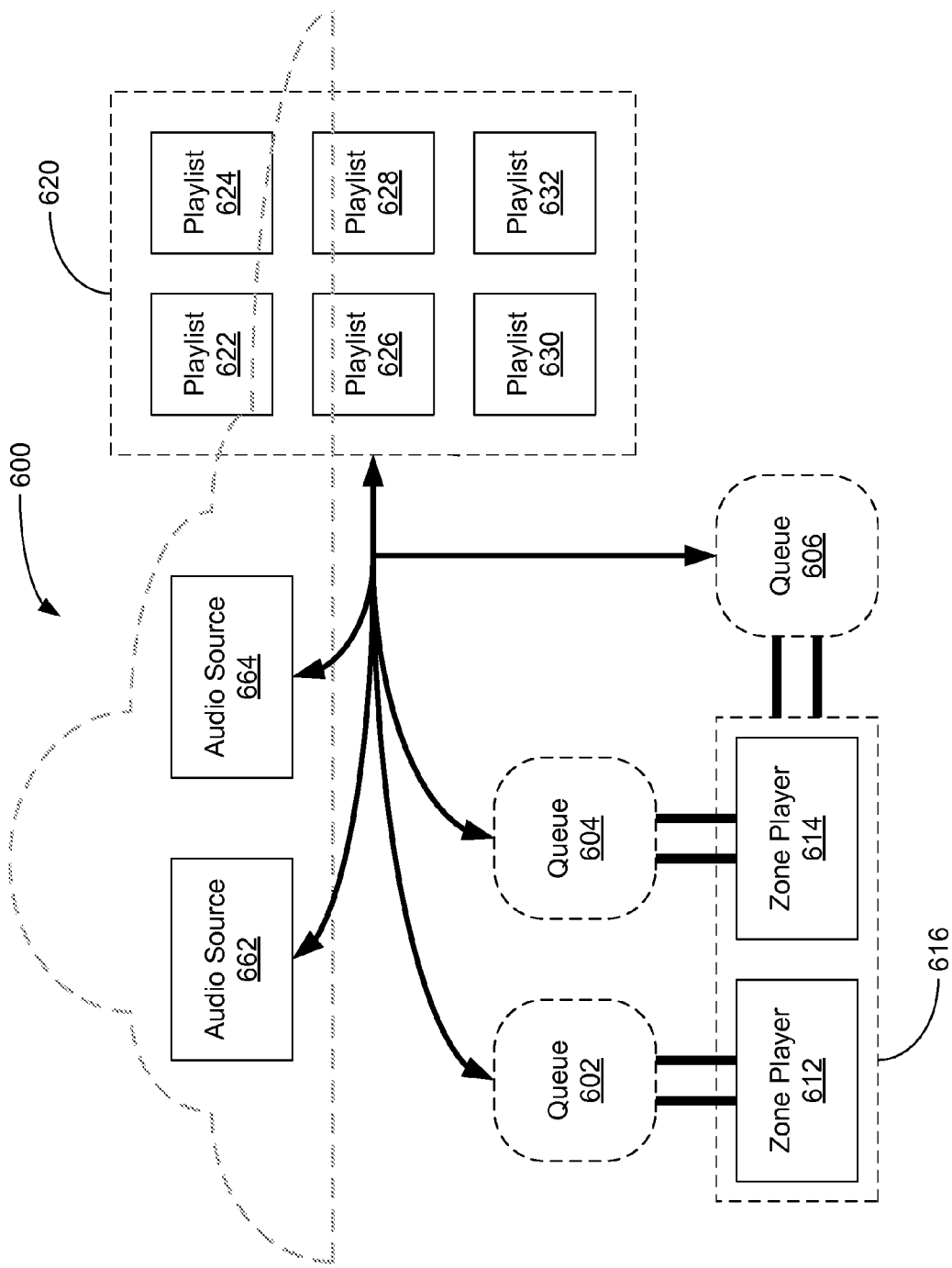
FIG. 6 shows an example network for media content playback.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (e.g., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. In some embodiments, when the group is no longer in existence, queue 606 is assigned to zone players 612 and/or 614. Each zone player and each combination of zone players in a network of zone players, such as those shown in FIG. 1 or that of example zone players 612, 614, and example combination 616, may be associated with one or more corresponding playback queues.

A playback queue, such as playback queues 602, 604, 606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the playlist 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
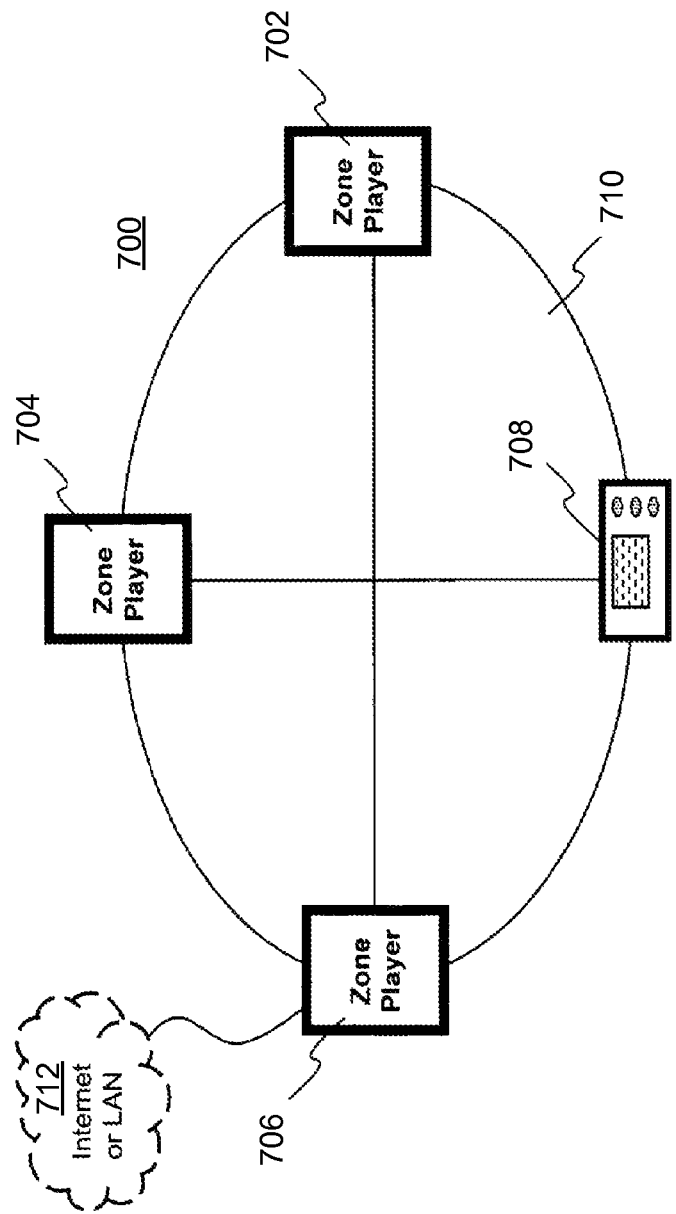
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 708) also running a CP application module, for example. The zone player is any other device on the network that is placed to participate in the automatic configuration process. The ZP, as a notation used herein, includes the controller 708 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
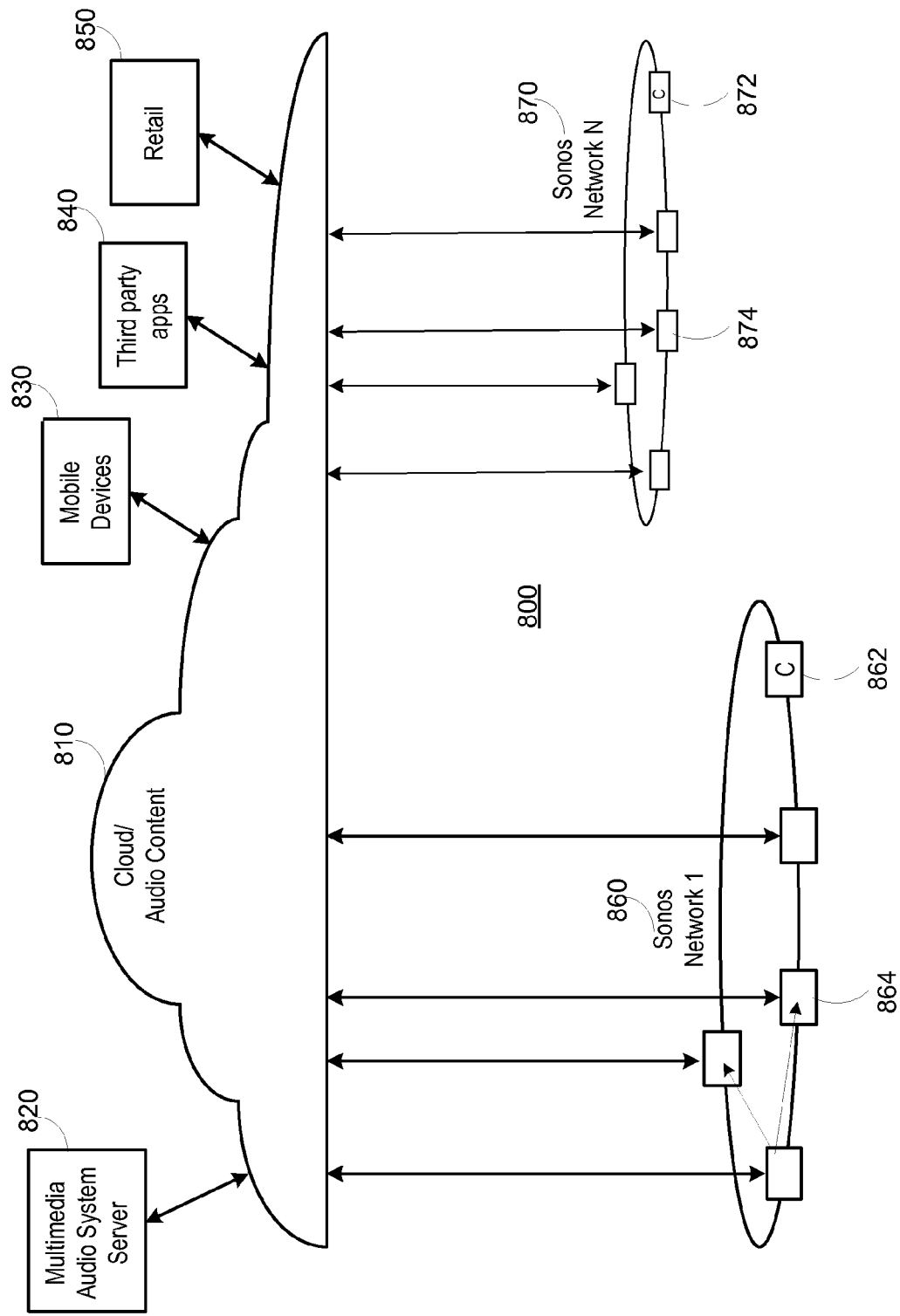
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Associating with Playback Queues

Figure 9:
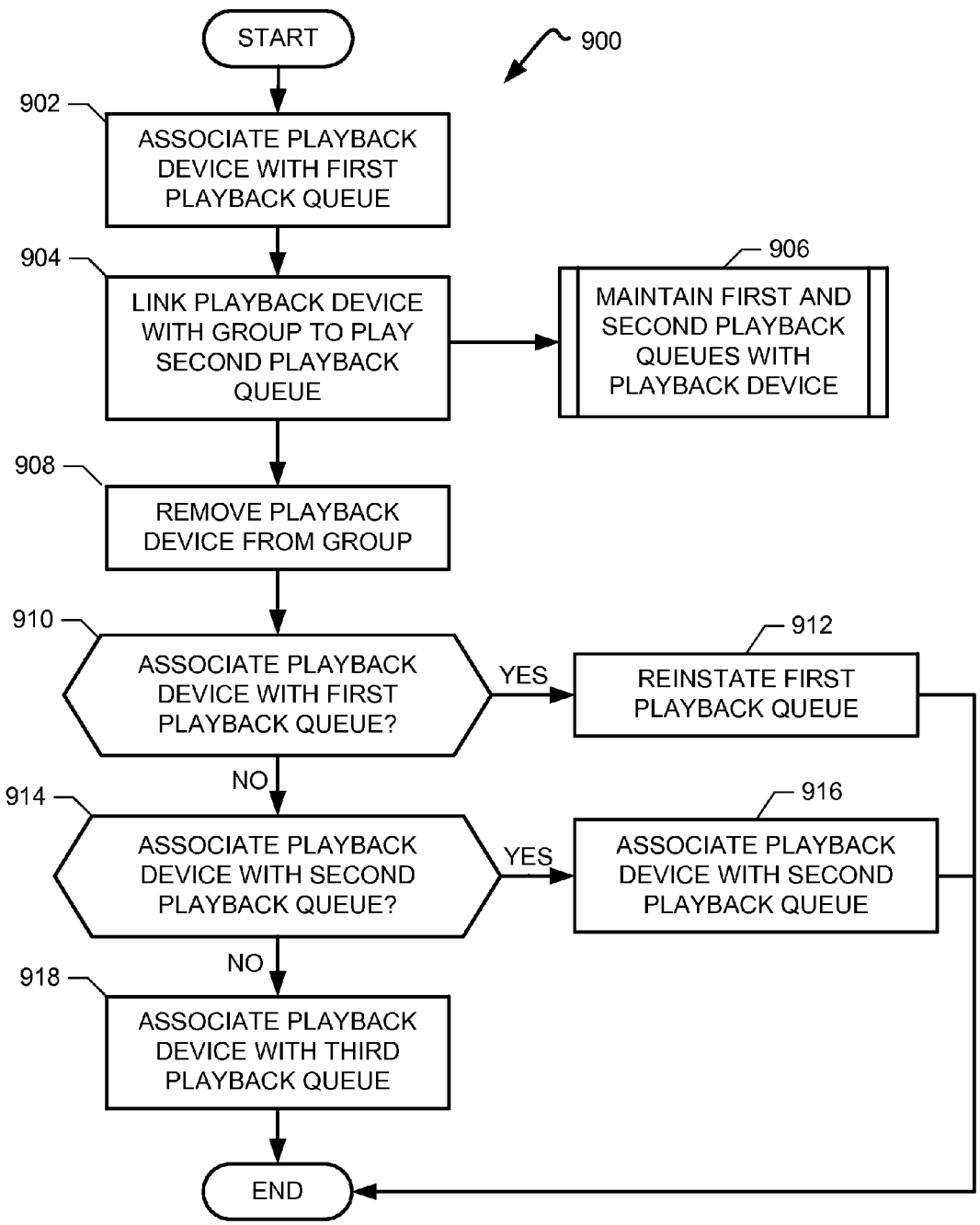
FIG. 9 illustrates a flow diagram of an example method to associate a playback device with a playback queue.

FIG. 9 shows an illustrative flowchart for an example method 900 to automatically associate a playback device (e.g., zone player) with a playback queue upon dissociation of the playback device from a group of networked playback devices. FIG. 9 further shows the example method 900 to include maintaining an association with multiple playback queues.

At block 902, a playback device is associated with a first playback queue. In some examples, the playback device is associated with the first playback queue when the queue is created. In other examples, the first playback queue is an existing playback queue with which the playback device is associated. For example, after creation, the first playback queue may persist for a period of time without being associated with the playback device and/or any other playback devices or networked groups of playback devices. In some examples, the playback device plays the audio content of the first playback queue. In such examples, the first playback queue may be considered an active queue of the playback device.

In some embodiments, the first playback queue and/or other playback queues discussed herein are stored locally in memory on the playback device. In other embodiments, playback queues, including the first playback queue, are stored remotely relative to the playback device. For example, the first playback queue may be stored in a cloud-based network or on a second playback device for access by the playback device.

In some embodiments, the first playback queue and/or other playback queues discussed herein include information identifying one or more items of audio content for play by the playback device. In other embodiments, the first playback queue includes zero items, such that the first playback queue has been created and is associated with the playback device, but does not yet include information identifying audio content for playback. Information identifying audio content may be continuously added to and/or removed from the first playback queue and/or other playback queues discussed herein.

At block 904, the playback device joins a group of playback devices to play audio in synchrony. The group includes at least a second playback device and in some examples, the group includes additional playback devices. A second playback queue, or group queue, is associated with the group for playback of audio content by the playback devices of the group. In some examples, one or more of the playback device, the second playback device, and/or other playback devices of the group is a bonded zone (e.g., a consolidated player, a paired player, etc.).

Upon joining the group, the playback device is associated with the group queue. In joining the group, the playback device plays the content of the group queue synchronously with the other playback devices of the group, including the second playback device. In some embodiments, a copy of the group queue may be stored in the memory on the playback device such that the playback device plays from the local copy. In some examples, the playback device plays content of the group queue by accessing pointers associated with the media content. In other embodiments, the playback device plays the content of the group queue without receiving a copy of the group queue. In such examples, the playback device receives content to play from the second playback device without, for example, storing a copy of the second playback queue.

As described at block 906, in some examples of the example method 900, when the playback device is linked to the group, the playback device maintains an association with the first playback queue while associated with the second playback queue (i.e., group queue). In some embodiments, the playback device maintains the first playback queue by locally storing a copy of the first playback queue upon joining the group. In other embodiments, the first playback queue is stored remotely and the playback device maintains an association with the remotely stored first playback queue. In yet another embodiment, the playback device may save the items of the first playback queue in the order of play at the time the playback device joined the group or in some other configuration. In addition to maintaining an association with the first playback queue upon joining the group, the playback device is associated with the second playback queue such that the playback device is simultaneously associated with both the first playback queue and the second playback queue.

In some embodiments, the playback device may associate with multiple playback queues in addition to the first playback queue and the second playback queue while in the group, via, for example, local storage of or remote access to additional playback queues. Although the playback device may associate with multiple playback queues, a particular playback queue may be selected as the active queue for the playback device. The playback device plays the audio content of the active queue. For example, as a member of the group, the playback device may play the group queue as the active queue. In some embodiments, a particular playback queue is selected as the active queue by, for example, assigning the playback queue as the active queue for the playback device.

At block 908, the playback device is removed from the group. Removing the playback device from the group may involve, for example, a user input to ungroup or remove the playback device from the group. In some examples, the playback device leaves the group and is a stand-alone device not associated with any other groups. As a stand-alone device, the playback device may be a part of a bonded zone. In other examples, the playback device leaves the group and joins a different group.

Upon removal from the group, the playback device is associated with at least one playback queue such that the playback device is enabled to play content from the playback queue after removal from the group. In some embodiments, the playback device is automatically directed to a playback queue without further user input. In further embodiments, upon removal from the group, a playback queue is automatically assigned as the active playback queue of the playback device such that the playback device plays audio content of the active playback queue. The example method 900 includes removing the playback device from the group and automatically associating the playback device with a playback queue for as long as the playback device is in the group. As such, at any time for duration in which the playback device is in the group, the playback device may be ungrouped and automatically associated with a playback queue.

For example, at block 910 of the example method 900, a determination is made whether to associate the playback device with the first playback queue upon removal from the group. As noted above at block 906, in some embodiments, the playback device maintains an association with the first playback queue upon joining the group, for example, by storing the first playback queue locally. In such examples, block 910 may involve a determination to automatically assign the first playback queue as the active queue for the first playback device upon removal from the group. In other examples, association between the playback device and the first playback queue may be removed when the playback device joins the group. In such examples, block 910 may include re-associating the playback device with the first playback queue as the active queue. In the example method 900, the first playback queue persists for at least as long as the playback device is in the group such that the playback device may be re-associated with the first playback queue upon leaving the group.

At block 912, the first playback queue is automatically reinstated as the active playback queue for the playback device. For example, the playback device may recall a saved copy of the first playback queue and play from the saved copy of the first playback queue. In other examples, the first playback device may point to a remotely stored first playback queue and play from the remotely stored first playback queue. In some examples, the first playback queue is reinstated in the configuration in which the first playback queue was saved at the time the playback device joined the group. In other examples, the first playback queue may be recalled to play from the first item of the first playback queue. In other examples, the first playback queue is restored to play in some other configuration.

In some embodiments, the playback device is automatically associated with a queue other than the first playback queue upon removal from the group. At block 914, a determination is made whether to associate the playback device with the second playback queue, or the group queue, upon removal of the playback device from the group. In some examples, although the playback device has left the group, the playback device may be configured to continue to play the items in the group queue. For example, at block 916, the playback device is associated with the second playback queue upon removal of the playback device from the group. The playback device may be associated with the second playback queue by inheriting a copy of the second playback queue or remotely accessing the content of the second playback queue via a pointer.

In some embodiments, the second playback queue is associated with both the group and the playback device, respectively. Further, the playback device may play the audio content of the second playback queue as an active queue independent of the group. For example, the group and the playback device may each play the content of the second playback queue in a different order. In further embodiments, modification of the second playback queue by the playback device results in a new queue that is different from the second playback queue associated with the group. Example modifications to the second playback queue by the playback device may include content or order of play.

The playback device may be automatically associated with a third playback queue that is different from the first playback queue and the second playback queue. At block 918, the playback device is directed to a third playback queue when the playback device is ungrouped. The third playback queue may be, for example, a playback queue that has been created but not yet associated with a playback device. In other examples, the third playback queue is a playback queue that is associated with a third playback device, multiple different playback devices, and/or one or more groups different from the group that the playback device left. In other examples, the third playback queue contains one or more items copied from one or more of the first playback queue, the second playback queue, or another playback queue different from the first playback queue and the second playback queue.

In some examples, upon being associated with the third playback queue, the playback device plays the audio of the third playback queue. At the same time the playback device plays the third playback queue, the playback device may maintain an association with the first playback queue and/or the second playback queue, as described above (block 906). For example, the playback device may store copies of one or more of the first, second, or third playback queues. At a later time, the playback device may be directed to play the audio content of one of the first playback queue, the second playback queue, or other associated playback queues.

As shown in FIG. 9, in some embodiments of the example method 900, the first playback queue maintains association with one or more playback queues. As further shown in FIG. 9, upon dissociation from a group, the playback device is directed to at least one playback queue. In determining to which playback queue to direct the playback device upon removal from the group, the example method 900 is not limited to the determinations or the order of blocks 910, 914, and/or 918 as illustrated in FIG. 9.

In operation, for example, the example method 900 provides for flexibility in moving a zone player, or other playback devices, in and out of a networked group of zone players without disrupting the ability of the zone player to be in a play-ready state upon receiving a command to operate. For example, a user may assign a zone player to a group to play media content (e.g., songs) in a group queue. Subsequently, the user may decide to remove the zone player from the group. In response to removal of the zone player from the group, the example method 900 automatically directs the zone player to a playback queue such that the zone player is continuously enabled to play items of a queue. For example, based on some user setting(s) or other configuration, the example method 900 may restore an earlier playback queue with which the zone player maintained an association upon joining the group as an active queue. Optionally, the example method 900 may provide for the zone player to be independently associated with the group queue so that the zone player continues to play the group queue after leaving the group. In some examples, the zone player may join a new group or associate with a new queue and play the content of the new queue. The example method 900 enables a zone player to seamlessly move between operating as part of a group or as a stand-alone device without disrupting the ability of the zone player to play audio content on demand.

Figure 10:
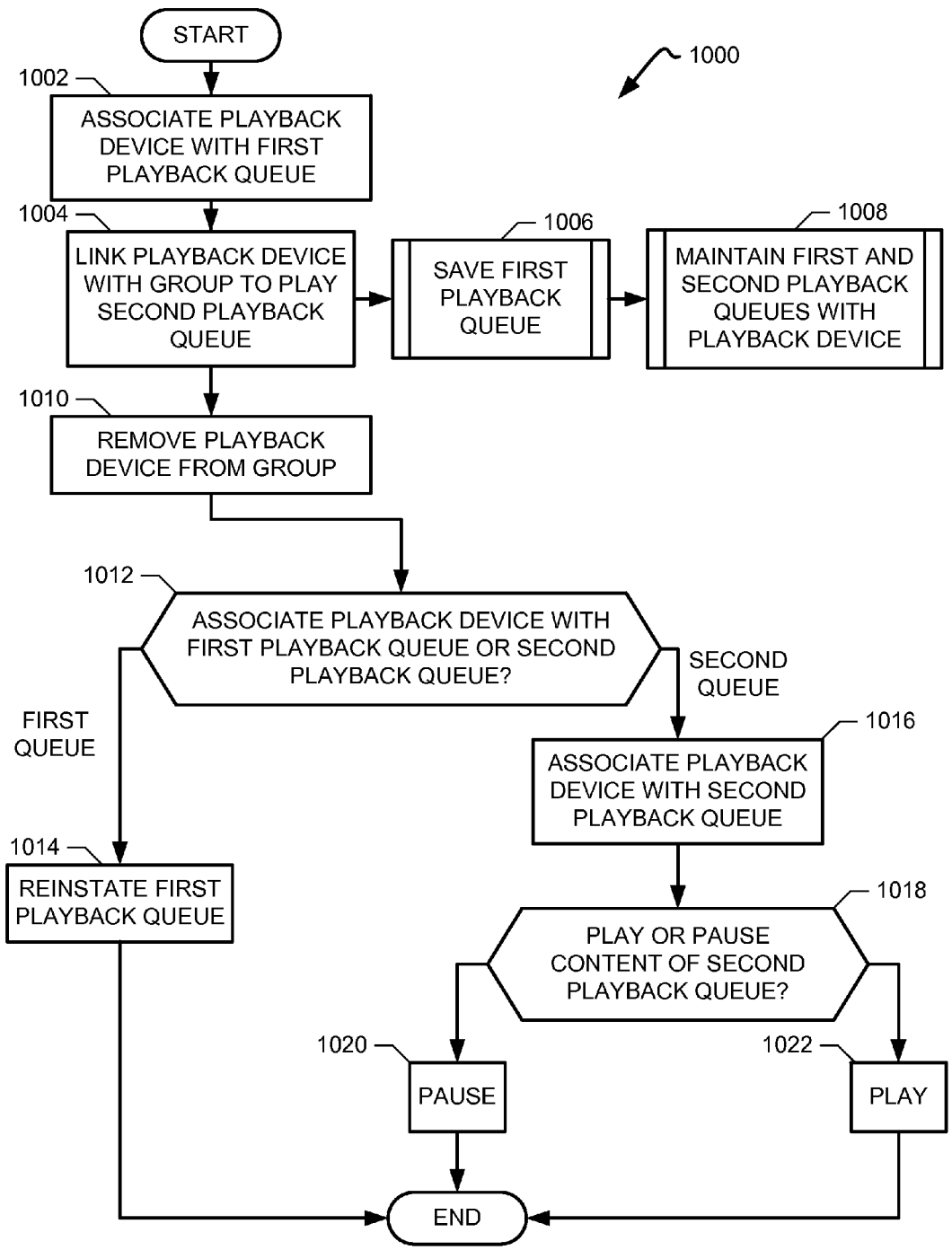
FIG. 10 illustrates a flow diagram of an example method to maintain and associate a playback device with at least one of a saved playback queue or a group queue.

FIG. 10 illustrates a flow diagram of an example method 1000 to associate a playback device with at least one of a saved playback queue or a group queue upon dissociation of the playback device from a group.

At block 1002, the playback device is associated with a first playback queue. As noted above with respect to block 902 of the example method 900, the first playback queue may be a previously existing playback queue or a playback queue created for the playback device. Further, the first playback queue may be stored locally on the playback device or accessed remotely by the playback device. As described above with respect to the example method 900, the playback device may play the audio content of the first playback queue.

At block 1004, the playback device is linked to a group associated with a second playback queue. Upon association with the group, the playback device plays the content of the second playback queue in synchronization with other playback devices in the group.

Although the playback device plays the second playback queue as part of the group, the playback device may continue to associate with the first playback queue. At block 1006, upon joining the group, the playback device saves the first playback queue. For example, content of the first playback queue may be saved in an order of play as at the time the playback device joined the group. In other examples, the playback device saves the first playback queue in some other configuration.

In saving the first playback queue and associating with the second playback queue, the playback device maintains the first playback queue and the second playback queue, as represented at block 1008. For example, as a member of the group, the playback device plays the content of the second playback queue synchronously with other playback devices in the group. Simultaneously or substantially simultaneously, the playback device maintains an association with the first playback queue by, for example, storing a copy of the first playback queue or maintaining a pointer to a remotely stored first playback queue.

At block 1010, the playback device is removed or dissociated from the group. Dissociation of the playback device from the group does not affect the play mode of the group. In certain embodiments, the group continues to play the second playback queue.

In the example method 1000, removal of the playback device from the group is a trigger to automatically associate or direct the playback device to a playback queue to enable the playback device to access audio content. As described with respect to the example method 900 of FIG. 9, for as long as the playback device is in the group, the playback device may be removed from the group and automatically associated with a playback queue. At block 1012, a determination is made to direct the playback device to the first playback queue or the second playback queue. The determination at block 1012 may include, for example, directing the playback device to play the first playback queue as the active queue or associating the playback device with the second playback queue to play the second playback queue as a stand-alone device.

At block 1014, the first playback queue is reinstated to the playback device as the active queue. The order of play of the content of the first playback queue upon reinstatement may depend upon, for example, the manner in which the first playback queue was saved when the playback device joined the group. For example, the first playback queue may be restored or recalled to the playing order of the items of the queue when the playback device joined the group. In other examples, upon reinstatement as the active queue, the first playback queue returns to the first item of the queue or is configured to play in another manner.

In other examples, prior to playing the first playback queue as the active queue, the playback device may need or want to re-associate with the first playback queue. For example, the playback device may join the group, but not maintain an association with the first playback queue in the manner described at block 1006. After leaving the group, the playback device may re-associate with the first playback queue, thereby enabling the playback device to access the content of the first playback queue.

In other embodiments, upon dissociation from the group, the first playback queue is directed to associate with the second playback queue. At block 1016, the playback device is associated with the second playback queue. In some examples, the second playback queue, or the group queue, is selected as the active playback queue for the playback device after removal from the group. In some examples, the playback device may inherit or receive a copy of the second playback queue upon leaving the group such that playback device plays the second playback queue from the locally stored copy.

In other examples, the second playback queue may be shared between playback devices or groups that are not linked. For example, the group of the example method 1000 may include a first playback device, a second playback device, and a third playback device. Upon dissociation of the first playback device from the group, the group continues to play the second playback queue. The second playback queue is also associated with the first playback device such that each of the group and the first playback device traverse the second playback queue independently. For example, the second playback device and the third playback device play the second playback queue synchronously as part of the group. The first playback device also plays second playback queue. In some examples, one or more items of the second playback queue is played in a different order by the first playback device and the group. In some examples, the second playback queue is modified by the first playback device. In such examples, the modified second playback queue is treated as a new queue that is not shared with the group. In other examples, the second playback queue is modified by the group such that the group plays the modified second playback queue and the first playback device continues to play the unmodified second playback queue.

In the above example, the second playback queue may be stored on the first playback device, the second playback device, the third playback device, a cloud network, or in another location. The first playback device and the group may access the second playback queue from its stored location. Further, the second playback queue and other playback queues discussed herein may be stored on a playback device or network but, in some examples, not associated with the storage playback device or network.

In some embodiments of the above example, upon removal from the group, the first playback device is associated with the second playback queue and plays the second playback queue but continues to maintain an association with the first playback queue. In such examples, the second playback queue is the active queue from which the playback device plays audio content. For example, the first playback device may play the second playback queue while storing the first playback queue locally. In some examples, at a later time, the first playback device is directed to play the first playback queue as the active queue.

At block 1018 of the example method 1000 as illustrated in FIG. 10, the second playback queue is selectively associated with the playback device as the active queue. In some embodiments, although the playback device is enabled to access the content of the second playback queue after leaving the group, some user setting(s) or configuration(s) provide for audio control with respect to whether the playback device automatically plays the content of the second playback queue. At block 1018, a determination is made whether to play or to pause the audio content of the second playback queue upon association of the second playback queue with the playback device.

For example, at block 1020, the second playback queue is associated with the playback device as an active queue but the playback device is configured to pause audio of the second playback queue upon removal from the group. Play of the second playback queue by the playback device may resume at a later time. In other examples, after leaving the group and independently associating with the second playback queue, the playback device automatically plays the second playback queue without further user input, as shown at block 1022. Play of the second playback queue at block 1022 or resumption of play at a later time at block 1020 includes, for example, playing the first item of the second playback queue, playing the item of the second playback queue that was playing when the playback device left the group, or playing the items of the second playback queue in some other configuration. The determination at block 1018 for the playback device to play or pause the content of the second playback queue does not affect the play mode of the group.

In some embodiments, a similar or substantially similar determination as described at block 1018 to play or pause the content of the second playback queue is made at block 1014 with respect to the first playback queue. For example, at block 1014, the first playback queue is reinstated as the active queue of the playback device upon removal of the playback device from the group, but the playback device may not play the audio content of the first playback queue until receiving further input.

In operation, for example, the example method 1000 provides for a zone player, or other playback device, to maintain multiple playback queues as the zone player moves in and out of a networked group or is assigned to or shares different playback queues. A user may associate a zone player operating as a stand-alone device with a first playback queue, and in some cases, the zone player may be associated with multiple playback queues. In some examples, the zone player may play the content of an associated queue, such as the first playback queue, as the active queue. The user may subsequently associate the zone player to a networked group to play a group queue. The example method 1000 provides for the zone player to join the group without losing the first queue or previously associated queues. For example, the zone player may save a copy of the first queue upon joining the group or maintain association with a remotely stored first queue. In response to leaving the group, the zone player may automatically recall the first queue as the active queue without the user needing to reassociate the zone player with the first queue. Play of the first queue may resume in the state of play as when the zone player joined the group, thereby providing for uninterrupted play of the first queue before and after the zone player associates with group.

Further, the example method 1000 provides for the zone player to automatically associate with the group queue after the zone player leaves the group. Further, in associating the zone player with the group queue, the zone player may independently play content from the group queue as the active queue for the zone player. For example, although a user may remove the zone player from the group, the user may wish to continue to play the group queue from the zone player. In the example method 1000, the zone player may inherit a copy of the group queue or share access to the group queue with the group such that the zone player plays the group queue as an active queue without being linked to the group. Additionally, the user may modify the group queue with respect to the zone player. For example, the user may create a new queue for the zone player that is at least partially based on the group queue. The example method 1000 provides for the zone player to maintain, for example, the group queue, the modified grouped queue, and/or multiple other playback queues to restore or move between queues as the user controls the zone player within a network.

In operation, when the zone player is removed from the group, the example method 1000 provides for the zone player to be automatically associated with a playback queue, as described above. Further, in associating with the queue, the example method 1000 provides for the zone player to automatically play the audio content of the queue without requiring further user input. For example, a user may remove the zone player from the group and upon leaving the group, the zone player may be automatically directed to a saved queue. Immediately or substantially immediately upon being directed to the saved queue, the zone player begins to play the audio content of the saved queue without requiring the user to, for example, press a button on the zone player to commence play. The example method 1000 provides for the zone player to transition between a group queue and another queue while providing for substantially continuous play of audio content by the zone player.

Additionally, the example method 1000 provides for audio control of the zone player after leaving the group in that zone player is enabled to play a queue after leaving the group, but does not play the audio content until receiving further user input. For example, a user may remove the zone player from the group and prefer for the zone player not to play audio at that time. The example method 1000 provides for association of the zone player with a queue to prevent the zone player from having an empty playback queue upon removal from the group. Further, the example method 1000 enables the zone player to play items in a queue when the user wishes to resume operation of the zone player. The example method 1000 facilitates ready operation of the zone player at the user's command.

Figure 11:
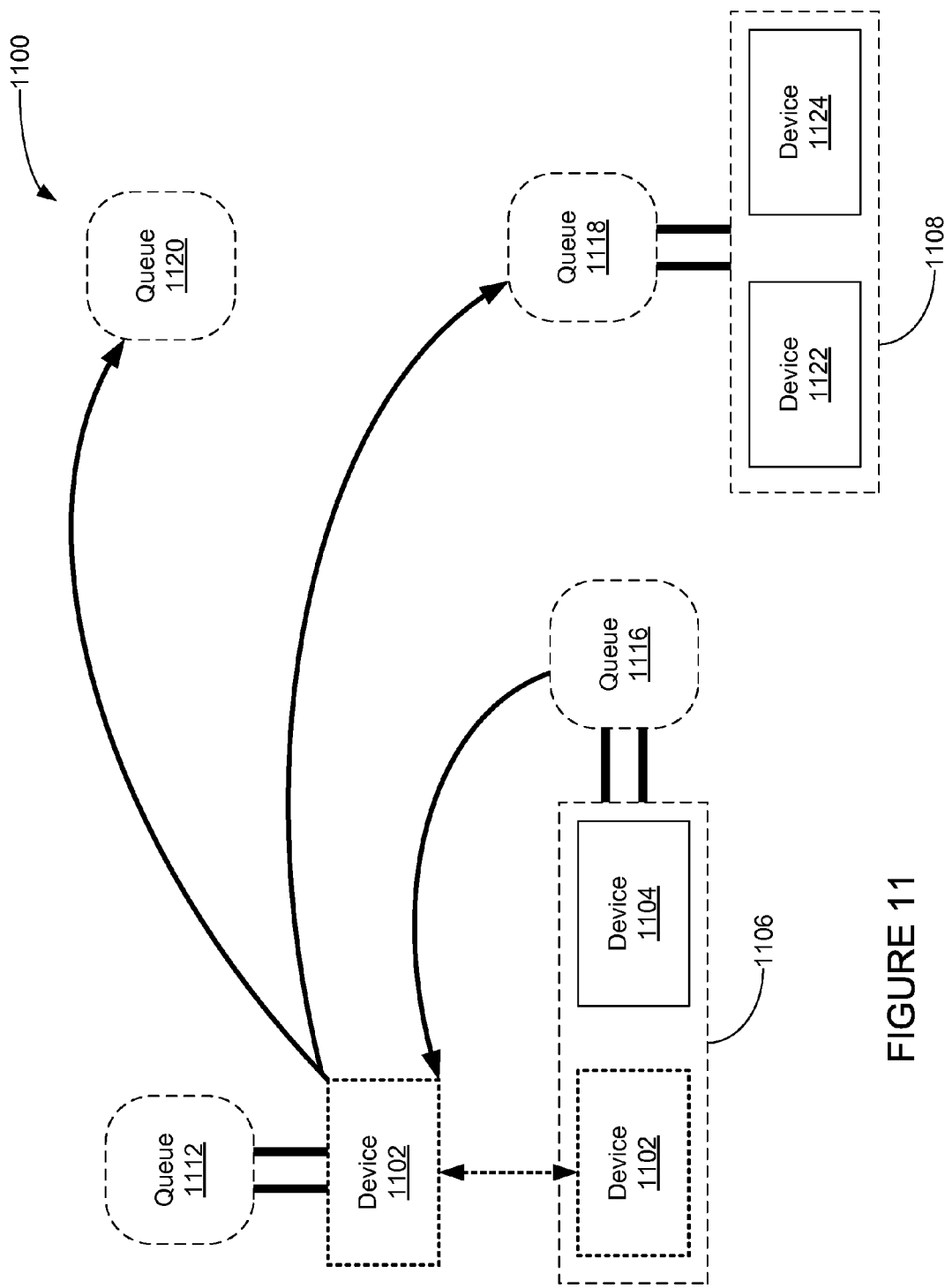
FIG. 11 shows an example system including a plurality of playback queues and at least one associated example zone player.

FIG. 11 illustrates an example system 1100 for associating a playback device with a playback queue upon removal of the playback device from a group.

In FIG. 11, an example playback device 1102 is associated with a playback queue 1112. In some examples, the playback queue 1112 is a queue created for the playback device 1102. In other examples, the playback device 1102 is associated with the playback queue 1112 at a later time after creation of the playback queue 1112. In some examples, the playback queue 1112 is an active queue for the playback device 1102, such that the playback device 1102 plays the content of the playback queue 1112.

The example playback device joins a group 1106. The group 1106 includes at least one second playback device 1104. The group 1106 is associated with a group queue 1116.

Upon joining the group 1106, the playback device 1102 is associated with the group queue 1116. Further, upon joining the group, the playback device 1102 plays the content of the group queue 1116. While the playback device 1102 is in the group 1106, the playback device 1102 maintains an association with the playback queue 1112. For example, the playback device 1102 may store a copy of the playback queue 1112 or continue to affiliated with the playback queue 1112 via remote access to a cloud network.

In the example system 1100, the playback device 1102 leaves the group 1106, in response to, for example, a user input to remove the device from the group. Upon dissociation from the group, the device 1102 is associated with a playback queue so as to avoid an empty playback queue. In the example system 1100, when the playback device 1102 is ungrouped from the group 1106, the playback device 1102 is automatically associated with a playback queue without further user input.

For example, the playback device 1102 may be automatically directed to the saved playback queue 1112. In such examples, the playback queue 1112 is reinstated for play on the playback device 1102 as the active playback queue of the playback device 1102.

In other examples, upon leaving the group 1106, the playback device 1102 is associated with, or inherits, the group queue 1116. For example, the playback device 1102 may store a copy of the group queue 1116 or remotely access the group queue 1116 to play the group queue 1116 separately from the group 1106.

In some examples, the second playback device 1104 continues to associate with the playback queue 1116 after the playback device 1102 has left the group 1106. For example, the second playback device 1104 may remain as part of the group 1106 with other playback devices. In other examples, the group 1106 may no longer exist after the playback device 1102 leaves the group such that the second playback device 1104 is the only playback device associated with the group queue 1116. In such examples, the second playback device 1104 may continue to associate with the former group queue 1116. In some examples, both the playback device 1102 and the second playback device 1104 are associated with the group queue 1116 and play the playback queue 1116 as active queues, but traverse the playback queue 1116 separately.

In other examples, upon leaving the group 1106, the playback device 1102 is automatically grouped with a new group 1108 including at least playback devices 1122, 1124. Upon joining the group 1108, the playback device 1102 is associated with playback queue 1118 of the group 1108.

In other examples, the playback device 1102 is automatically associated with a new playback queue 1120. In some examples, the playback queue 1120 is a previously established queue associated with zero or more playback devices. In some examples, the playback queue 1120 includes items copied from, for example, one or more of the playback queue 1112 of the playback device 1102 or the group queue 1116, or another playback queue different from the playback queue 1112 of the playback device 1102 or the group queue 1116.

In the example system 1100, upon leaving the group 1106, the playback device 1102 automatically associates with a playback queue that include one or more items for play by the playback device 1102. Further, in the example system 1100, the playback device 1102 may be associated with multiple queues at any point in time. For example, the playback device may associate with one or more of playback queues 1112, 1116, 1118, or 1120 as the playback device 1102 moves within the system 1100. In addition to maintaining an association with one or more of playback queues 1112, 1116, 1118, or 1120, the playback device 1102 may be selected to play one of the playback queues 1112, 1116, 1118, or 1120 as an active queue.

In certain embodiments, the playback device 1102 maintains at least one playback queue at all times such that the playback device 1112 is enabled to responsively play items in a playback queue upon receiving an input to operate.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Certain embodiments disclosed herein provide a method including receiving a first command by a device to group a first playback device with at least a second playback device for synchronous audio playback. In the example method, the group is associated with a first playback queue. The first playback queue comprises a list of one or more items for playback by the group. The example method includes, for as long as the playback device is in the group, receiving a second command by the device to remove the first playback device from the group, wherein the first playback device is ungrouped and automatically associated with a second playback queue. In the example method, the second playback queue comprises a list of one or more items for playback by the playback device.

Certain embodiments provide an example playback device comprising a processor configured to group the playback device with at least a second playback device for synchronous audio playback. The group is associated with a first playback queue comprising a list of one or more items for playback by the group. The processor is configured, for as long as the playback device is in the group, to remove the playback device from the group. The first playback device is ungrouped and automatically associated with a second playback queue. The second playback queue comprises a list of one or more items for playback by the playback device.

Certain embodiments provide a non-transitory computer-readable storage medium including a computer program which, when executed by a processor, implements at least a method. The example method includes receiving a first command by a device to group a first playback device with at least a second playback device for synchronous audio playback. In the example method, the group is associated with a first playback queue. The first playback queue comprises a list of one or more items for playback by the group. The example method includes, for as long as the playback device is in the group, receiving a second command by the device to remove the first playback device from the group, wherein the first playback device is ungrouped and automatically associated with a second playback queue. In the example method, the second playback queue comprises a list of one or more items for playback by the playback device.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A first playback device comprising:
one or more processors; and
tangible, non-transitory, computer-readable media having instructions encoded therein, wherein the instructions, when executed by the one or more processors, cause the first playback device to perform a method comprising:
associating the first playback device with a first playback queue that identifies one or more items for playback by the first playback device;
receiving an instruction to enter a playback group with a second playback device, wherein the second playback device is associated with a second playback queue that identifies one or more items for playback by the second playback device;
entering the playback group with the second playback device, wherein the playback group is associated with the second playback queue, wherein the first playback device is configured to play items from the second playback queue in synchrony with the second playback device while the first playback device and the second playback device are in the playback group;
receiving an instruction to leave the playback group; and
leaving the playback group, wherein leaving the playback group comprises automatically associating the first playback device with a third playback queue that identifies one or more items for playback by the first playback device, wherein the third playback queue persisted without association with a playback device from a time prior to being automatically associated with the first playback device.

2. The playback device of claim 1, wherein the third playback queue is the first playback queue and automatically associating the first playback device with the third playback queue further comprises automatically reinstating the first playback queue for playback by the first playback device.

3. The playback device of claim 2, wherein the first playback queue persists without association with a playback device for a time after the grouping and prior to the reinstating.

4. The playback device of claim 1, the method further comprising:
cause the association of the first playback device with the first playback queue to be maintained upon the entering the playback group.

5. The playback device of claim 1, wherein the third playback queue is the first playback queue.

6. The playback device of claim 5, wherein automatically associating the first playback device with the first playback queue comprises remotely accessing the first playback queue.

7. The playback device of claim 1, the method further comprising:
cause the first playback device to automatically play the third playback queue after automatically associating the first playback device with the first playback queue.

8. The playback device of claim 1, wherein the first playback queue resides on the second playback device, and wherein the second playback queue resides on the first playback device.

9. A non-transitory computer-readable storage medium including a computer program which, when executed by a processor, implements a method, the method comprising:
associating a first playback device with a first playback queue, the first playback queue identifying one or more items for playback by the first playback device;
receiving an instruction to enter a playback group with a second playback device, wherein the second playback device is associated with a second playback queue that identifies one or more items for playback by the second playback device;
entering the playback group with the second playback device, wherein the playback group is associated with the second playback queue, wherein the first playback device is configured to play items from the second playback queue in synchrony with the second playback device while the first playback device and the second playback device are in the playback group;

receiving an instruction to leave the playback group; and leaving the playback group, wherein leaving the playback group comprises automatically associating the first playback device with a third playback queue that identifies one or more items for playback by the first playback device, wherein the third playback queue persisted without association with a playback device from a time prior to being automatically associated with the first playback device.

10. The non-transitory computer-readable storage medium of claim 9, wherein the third playback queue is the first playback queue and automatically associating the first playback device with the third playback queue further comprises automatically reinstating the first playback queue for playback by the first playback device.

11. The non-transitory computer-readable storage medium of claim 10, wherein the first playback queue persists without association with a playback device for a time after the grouping and prior to the reinstating.

12. The non-transitory computer-readable storage medium of claim 9, the method further comprising:

cause the association of the first playback device with the first playback queue to be maintained upon the entering the playback group.

13. The non-transitory computer-readable storage medium of claim 9, wherein the third playback queue is the first playback queue.

14. The non-transitory computer-readable storage medium of claim 13, wherein automatically associating the first playback device with the first playback queue comprises remotely accessing the first playback queue.

15. The non-transitory computer-readable storage medium of claim 9, the method further comprising:

cause the first playback device to automatically play the third playback queue after automatically associating the first playback device with the first playback queue.

16. The non-transitory computer-readable storage medium of claim 9, wherein the first playback queue resides on the second playback device, and wherein the second playback queue resides on the first playback device.

17. A method comprising:

associating a first playback device with a first playback queue that identifies one or more items for playback by the first playback device;

receiving an instruction to enter a playback group with a second playback device, wherein the second playback device is associated with a second playback queue that identifies one or more items for playback by the second playback device;

entering the playback group with the second playback device, wherein the playback group is associated with the second playback queue, wherein the first playback device is configured to play items from the second playback queue in synchrony with the second playback device while the first playback device and the second playback device are in the playback group;

receiving an instruction to leave the playback group; and leaving the playback group, wherein leaving the playback group comprises automatically associating the first playback device with a third playback queue that identifies one or more items for playback by the first playback device, wherein the third playback queue persisted without association with a playback device from a time prior to being automatically associated with the first playback device.

18. The method of claim 17, wherein the third playback queue is the first playback queue and automatically associating the first playback device with the third playback queue further comprises automatically reinstating the first playback queue for playback by the first playback device.

19. The method of claim 17, wherein the third playback queue is the first playback queue.

20. The method of claim 17, wherein the first playback queue resides on the second playback device, and wherein the second playback queue resides on the first playback device.

* * * * *